US012421067B2

(12) United States Patent
Schalk

(10) Patent No.: US 12,421,067 B2
(45) Date of Patent: Sep. 23, 2025

(54) METHOD AND APPARATUS FOR PROCESSING A LENGTH OF PADDING MATERIAL

(71) Applicant: Sprick GmbH Bielefelder Papier-und Wellpappenwerke & Co., Bielefeld (DE)

(72) Inventor: Bastian Schalk, Detmold (DE)

(73) Assignee: Sprick GmbH Bielefelder Papier-und Wellpappenwerke & Co., Bielefeld (DE)

( * ) Notice: Subject to any disclaimer, the term of this patent is extended or adjusted under 35 U.S.C. 154(b) by 318 days.

(21) Appl. No.: 17/996,977

(22) PCT Filed: Apr. 26, 2021

(86) PCT No.: PCT/EP2021/060816

§ 371 (c)(1),
(2) Date: Oct. 24, 2022

(87) PCT Pub. No.: WO2021/214340

PCT Pub. Date: Oct. 28, 2021

(65) Prior Publication Data

US 2023/0219778 A1 Jul. 13, 2023

(30) Foreign Application Priority Data

Apr. 24, 2020 (DE) ........................ 102020111299.8

(51) Int. Cl.

| | |
|---|---|
| ***B65H 18/26*** | (2006.01) |
| ***B65H 18/10*** | (2006.01) |
| *B31D 5/00* | (2017.01) |

(52) U.S. Cl.
CPC ............ *B65H 18/26* (2013.01); *B65H 18/10* (2013.01); *B31D 5/006* (2013.01); (Continued)

(58) Field of Classification Search
CPC .................... B65H 18/10; B65H 18/26; B65H 2701/11231; B65H 2701/1944; (Continued)

(56) References Cited

U.S. PATENT DOCUMENTS

| | | | |
|---|---|---|---|
| 5,674,172 | A | 10/1997 | Armington et al. |
| 5,832,696 | A | 11/1998 | Nagy et al. |

(Continued)

FOREIGN PATENT DOCUMENTS

| | | | | |
|---|---|---|---|---|
| DE | 69509098 | T2 | 10/1999 | |
| DE | 69510807 | T2 | 3/2000 | |
| DE | 102017113532 | A1 | 12/2018 | |
| DE | 102018107156 | A1 | 9/2019 | |
| JP | 4743051 | B2 * | 8/2011 | ............. B65H 19/29 |
| WO | 99/21702 | A2 | 5/1999 | |

OTHER PUBLICATIONS

Translation of JP 4743051 B2 (Year: 2011).*

(Continued)

*Primary Examiner* — Thomas M Wittenschlaeger
(74) *Attorney, Agent, or Firm* — Banner & Witcoff Ltd.

(57) ABSTRACT

In a method for processing a cushioning material strand, which is produced by a cushioning conversion machine from a web-shaped stock material (e.g. a roll or a leporello stack, for example of paper), the cushioning material strand is wound around a winding center into a cushioning material winding and is compressed during winding into the cushioning material winding.

21 Claims, 4 Drawing Sheets

Figure 1:
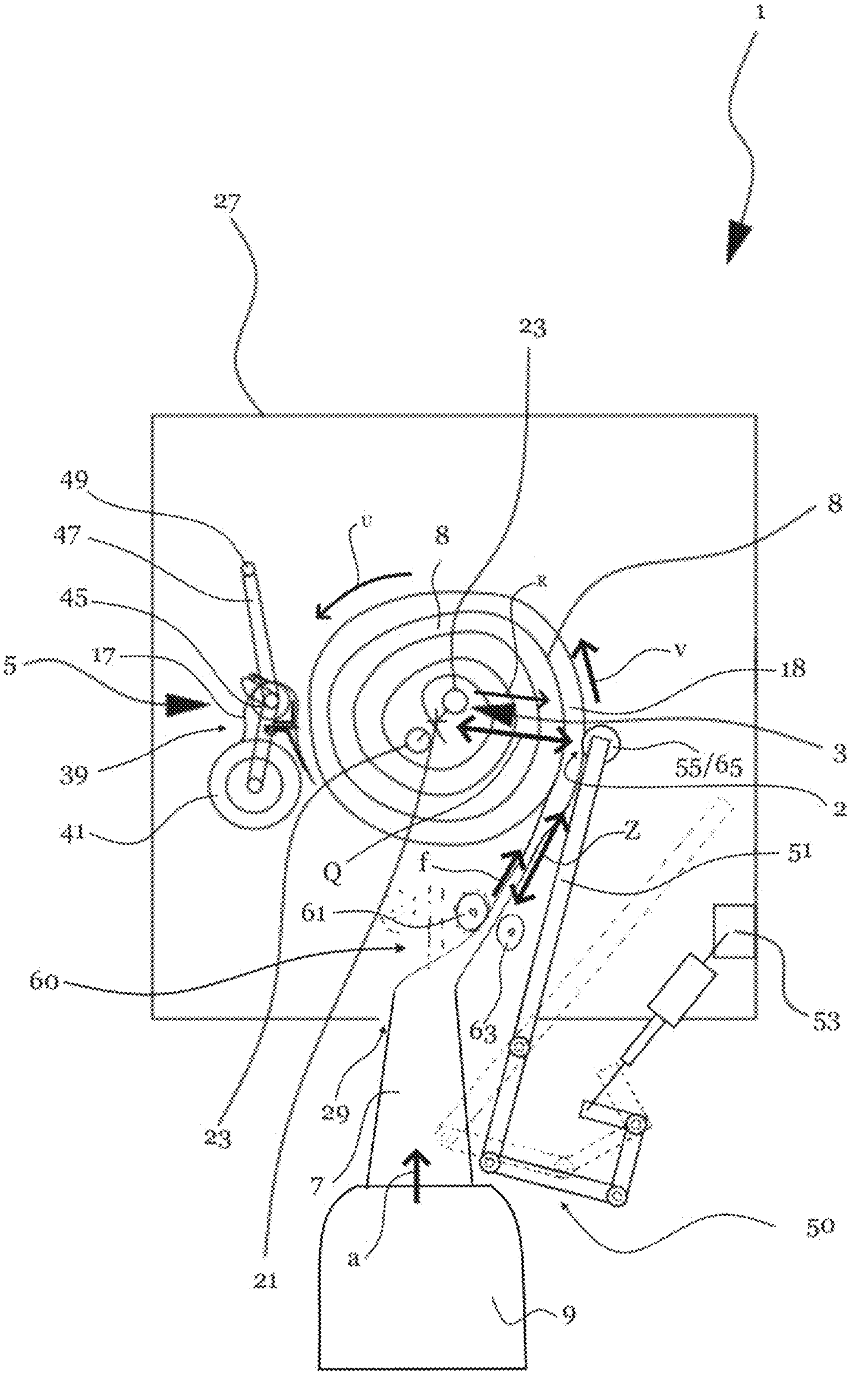

(52) U.S. Cl.
CPC ................ *B31D 2205/0047* (2013.01); *B31D 2205/007* (2013.01); *B31D 2205/0082* (2013.01); *B65H 2301/4492* (2013.01); *B65H 2301/5123* (2013.01); *B65H 2402/31* (2013.01); *B65H 2404/1521* (2013.01); *B65H 2701/11231* (2013.01); *B65H 2701/1944* (2013.01)

(58) Field of Classification Search
CPC ...... B65H 2701/177; B65H 2404/1521; B65H 2301/4492; B65H 2301/5123; B65H 2402/31; B31D 5/0069; B31D 5/006; B31D 2205/0082; B31D 2205/0064; B31D 2205/007; B31D 2205/0047; B31D 2205/0011
See application file for complete search history.

(56) References Cited

U.S. PATENT DOCUMENTS

| | | | | |
|---|---|---|---|---|
| 6,626,813 | B1 | 9/2003 | Ratzel et al. | |
| 11,453,564 | B2 | 9/2022 | Peterlini | |
| 2007/0102559 | A1 * | 5/2007 | McNeil .................. | B65H 18/26 242/526 |
| 2012/0273602 | A1 | 11/2012 | Sperry et al. | |
| 2021/0086466 | A1 | 3/2021 | Schalk et al. | |

OTHER PUBLICATIONS

German Office Action—App 102020111299.8, mailed Jan. 13, 2021.
International Search Report and Written Opinion—App PCT/EP2021/060816, Jul. 29, 2021 (with translation).

* cited by examiner

METHOD AND APPARATUS FOR PROCESSING A LENGTH OF PADDING MATERIAL

CROSS REFERENCE TO RELATED APPLICATIONS

This patent application is a U.S. National Stage Application of PCT/EP2021/060816, filed Apr. 26, 2021, which claims priority to German Patent Application No. 102020111299.8, filed Apr. 24, 2020, which is incorporated herein by reference in its entirety.

BACKGROUND

Field

The disclosure relates to a method and a device for processing a cushioning material strand. In this context, processing means in particular the processing of the cushioning material strand into a cushioning material winding.

Related Art

A cushioning material strand refers a three-dimensional paper cushioning product that is manufactured in a cushioning conversion machine from a web-shaped stock material, in particular a roll or a leporello stack, for example of paper. A cushioning material winding comprises a cushioning material strand, in particular spirally wound, which may optionally be provided with an adhesive tape for securing the outer end layer of the cushioning material strand to the cushioning material winding.

For large, heavy or delicate transport goods, for example solid metal castings such as an engine block or gearbox housing, fragile decorative items made of glass and porcelain, or electronic items such as televisions, due to fear of transport damages, form-adapted polystyrene trays are often used as transport protection. There is a desire for an economically viable, low-cost alternative to such cushioning materials.

The use of cushioning material windings made of paper, especially recycled paper, has proven to be a cost-effective and economically advantageous alternative for cushioning transport containers for such large, heavy or sensitive transport goods. However, conventional cushioning material windings require an undesirably high level of manual effort to create effective transport security with the aid of cushioning material windings, particularly from recycled paper.

WO 99/21702 A1 describes a device for processing cushioning material strands into cushioning material windings. Therein, the device comprises a cushioning conversion machine for converting a web-shaped stock material into a cushioning material strand and a winding device for winding the cushioning material strand around a winding center. A beak-like guide is provided at the exit of the cushioning conversion machine, which guides the cushioning material strand horizontally to the winding device. When the tines of the winding device are set in rotation, the tines take the cushioning material strand with them as they rotate and wind the cushioning material strand into a spiral cushioning material winding. To provide room for the radial expansion of the cushioning material winding, the beak-like guide is progressively spread open while remaining in loose tangential contact with the cushioning material winding. When the cushioning material spiral has reached a desired size, it can be separated from the stock material and removed from the winding device.

The winding device described in DE 10 2018 107 156 A1 is characterized by a winding axis aligned in the vertical direction. The winding device is formed by a reel with vertically downwardly aligned tines, which are arranged in a housing, so that the housing in a closed state surrounds the reel both in the winding axis axial direction on both sides, and transversely to the winding axis axial direction. Vertically below the winding device, a support surface for the cushioning material and the cushioning material winding formed therewith is arranged under the reel. The support surface can be movable like a trap door for dispensing a completed cushioning material winding. A receiving and/or storage container allows for the production of multiple cushioning material spirals or windings without requiring a user to remove cushioning spirals individually from the winding device. According to DE 10 2018 107 156 A1, furthermore a beak-like or scissor-like guiding device for guiding the cushioning material in a radial direction transverse to the winding axis is waived. Experience has shown that guiding the cushioning material strand to the winding device is a challenge, particularly during initial threading of the cushioning material strand into the winding device.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 a schematic top view of a device according to an exemplary embodiment of the disclosure with a cushioning conversion machine.

Figure 2:
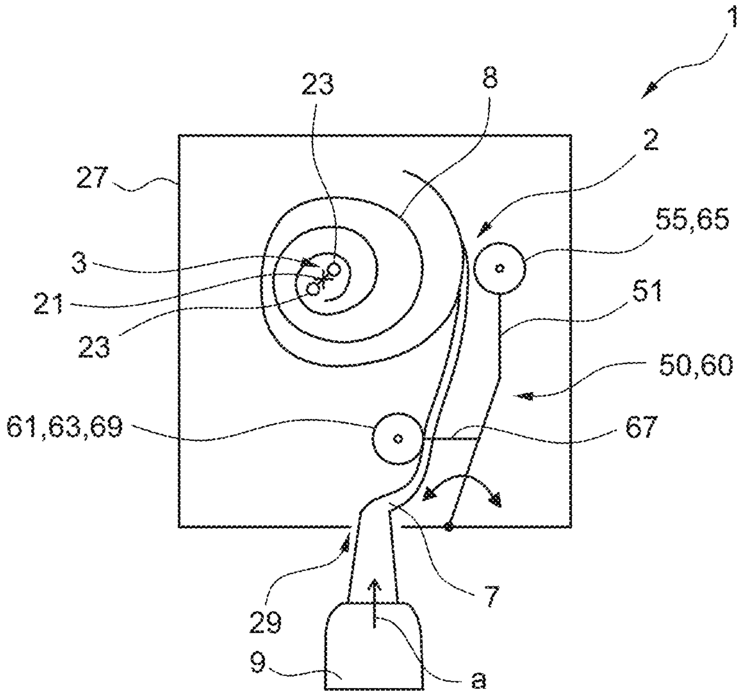

FIG. 2 a schematic top view of a device according to an exemplary embodiment of the disclosure with a cushioning conversion machine.

Figure 3:
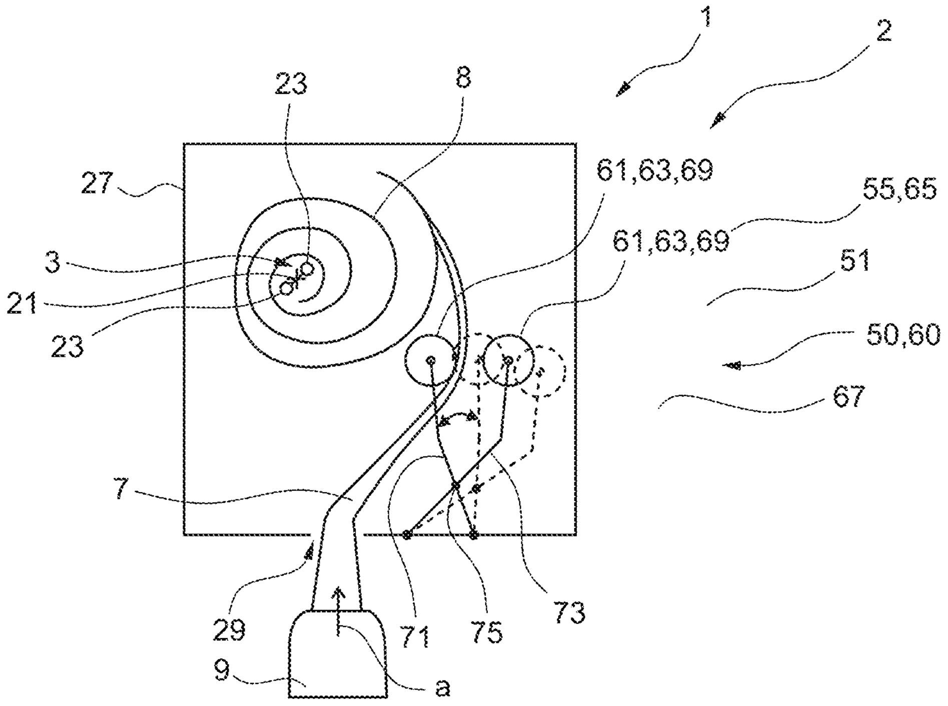

FIG. 3 a schematic top view of a device according to an exemplary embodiment of the disclosure with a cushioning conversion machine.

Figure 4:
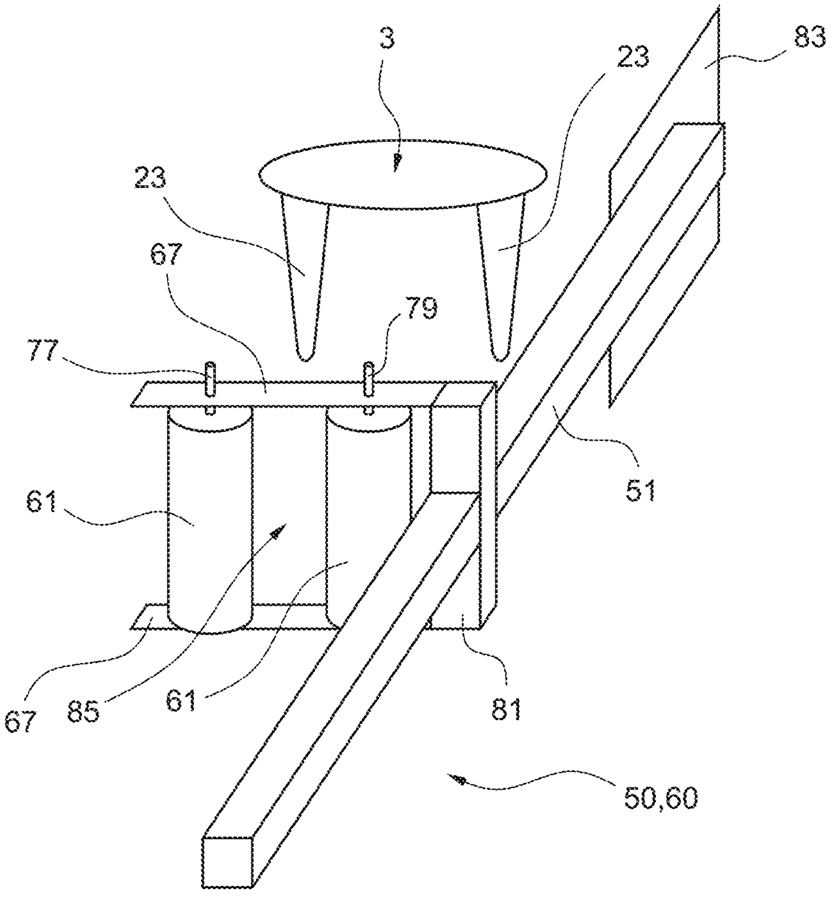

FIG. 4 a schematic perspective view of a section of a device according to an exemplary embodiment of the disclosure.

Figure 5:
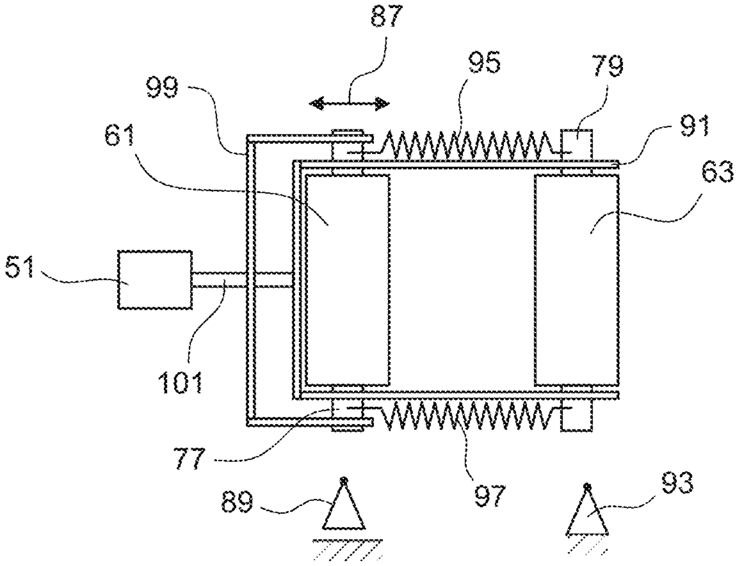

FIG. 5 a schematic side view of a section of a device according to an exemplary embodiment of the disclosure.

Figure 6:
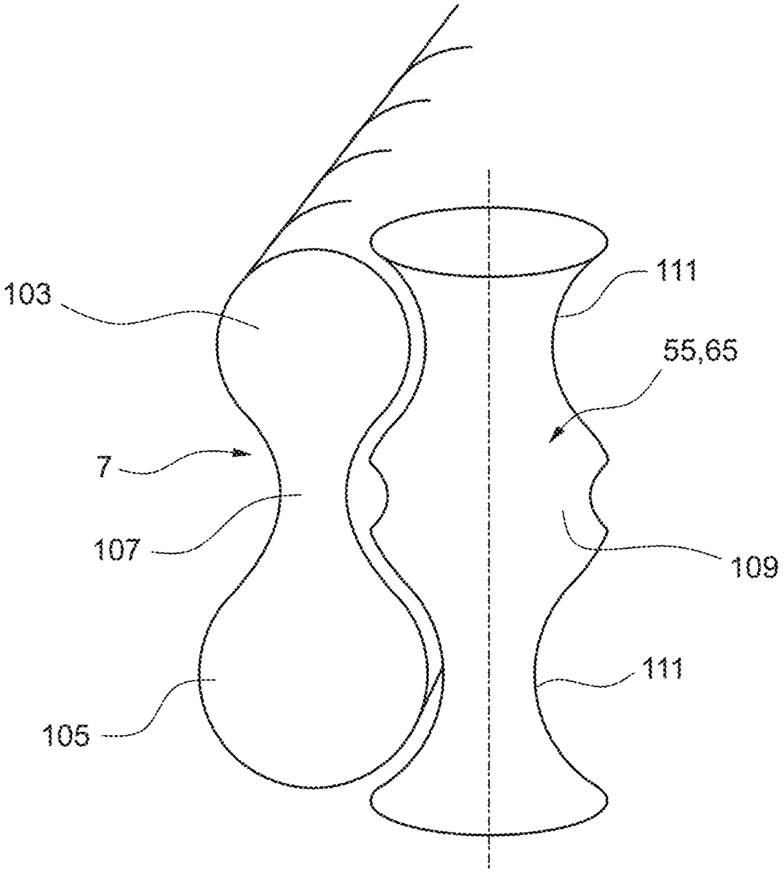

FIG. 6 a schematic perspective view of an unwinding wheel of a device, according to an exemplary embodiment of the disclosure, in engagement with a cushioning material strand.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details.

An object of the disclosure is to eliminate the disadvantages of the prior art and, in particular to provide a method and a device for processing cushioning material strands into cushioning material windings for easy use as transport protection, in particular for large, heavy and/or sensitive transport goods, which can be used quickly and easily even by untrained packing personnel.

Accordingly, a method is provided for processing a cushioning material strand into a cushioning material winding which has been produced by a cushioning conversion machine from a web-shaped stock material, in particular a roll or a leporello stack, for example of paper.

The cushioning material strand is made in particular from recycled paper. Recycled paper is in particular paper materials with a low proportion (less than 50%) of fresh fiber-containing paper material. In particular, paper materials containing 70% to 100% recycled paper are preferred. The recycled paper in the sense of the present disclosure is intended to be paper material that can have a tensile strength index along the machine direction of at most 90 Nm/g, preferably a tensile strength of 15 Nm/g to 60 Nm/g, and a tensile strength index transverse to the machine direction of at most 60 Nm/g, preferably a tensile strength of 5 Nm/g to 40 Nm/g. A DIN EN ISO 1924-2 or DIN EN ISO 1924-3 standard can be used to determine the tensile strength or tensile strength index. In addition, or alternatively, a recycled paper property or recovered paper property can be characterized by the so-called bursting resistance. A material in this sense is recycled paper with a burst index of at most 3.0 kPa*m^2/g, preferably with a burst index of 0.8 kPa*m^2/g to 2.5 kPa*m^2/g. The DIN EN ISO 2758 standard is used to determine the burst index. Furthermore, the packaging material has a basis weight of, in particular, 40 g/m^2 to max. 140 g/m^2. According to the disclosure, the starting packaging material can be in the form of a material web roll or a zigzag-folded packaging material stack, also known as a fanfold stack.

In particular, the cushioning material strand is manufactured in such a way that a particularly wavy deformation zone is formed centrally along the cushioning material strand by the cushioning conversion machine and is laterally bounded by two, in particular essentially uniform, bead ends. A cushioning conversion machine for producing cushioning material strands from a web-shaped stock material is shown in EP 3 159 291 B1. In addition, a large number of cushioning conversion machines are described in the prior art, which is why the specific design thereof will not be discussed further below.

Processing of the cushioning material strand may include the processing of the same into a cushioning material winding. In this context, a cushioning material winding can on the one hand be a packaging material means, such as a cushioning material spiral or a cushioning material helix, but on the other hand it can also form a sheathing of an object to be cushioned. Here, for example, the processing may involve winding the cushioning material strand around an article to be cushioned. In this regard, the resulting cushioning material winding may, for example, extend spirally around the article to be cushioned, with the cushioning material layers moving away from the article in a radial direction as the number of layers increases. In an exemplary embodiment, the cushioning material strand is processed into a cushioning material winding separate from the articles to be cushioned, such as a cushioning material spiral.

According to the disclosure, the cushioning material strand is compressed during winding into cushioning material winding. Contrary to the preconception that a cushioning material strand with a lower density relative to the initial stock material should not undergo compression during further processing into a cushioning material winding, it has surprisingly been found that a compression during winding is advantageous, particularly with regard to previously unrealized areas of application. By compressing the cushioning material winding compared to the initial cushioning material strand, the dimensional stability of the transport protection formed by the cushioning material can be improved. By compressing cushioning material, it can be avoided that heavy and/or sensitive transport goods, for example its corners or edges, would slip through between adjacent turns of the cushioning material winding and thus be more susceptible to transport damage. Furthermore, by introducing a compression of the cushioning material, a spring bias is affected which counteracts undesired deformation when the cushioning material is used, in particular a flattening material collapse. In the case of a flattening material collapse, cushioning material would be formed back into a flat, bent stock material web, which practically realizes no transport protection.

The cushioning material strand is compressed during winding with respect to its basic extension in at least one length, height and/or width dimension to effect compression during winding of the cushioning material winding. Conceivably, the cushioning material strand may be compressed in two directions, for example, width direction and height direction, width direction and length direction, or height direction and length direction, to effect compression during winding. Alternatively, the cushioning material strand may be compressed during winding in all three spatial directions: Width direction, height direction, and length direction, to effect compression. In an exemplary embodiment, the cushioning material strand is larger in its first transverse direction, which may be referred to as the width direction, than in a second transverse direction perpendicular to the first transverse direction, which is commonly referred to as the height direction. A cushioning material strand having an embossment, such as a roll embossment, in a direction transverse to the longitudinal direction, typically the cushioning material strand transverse direction perpendicular to the flat side of the roll embossment is the cushioning material strand height direction. In the case of a cushioning material strand having one or two cushioning tubes in a particularly first transverse direction laterally of an embossment, such as a roll embossment, this first transverse direction may be referred to as the width direction of the cushioning material strand.

A cushioning material winding has as main directions of extension a winding circumferential direction, a winding radial direction and a winding axial direction. Generally, in a cushioning material winding, the cushioning material strand extends circumferentially in a spiral around the winding center. The winding axial width may be defined by the width and/or height of a cushioning material strand which is wound into a cushioning material winding. Compression of the cushioning material strand may be performed with respect to the cushioning material winding in the circumferential direction, axial direction, and/or radial direction thereof. For example, compression of the cushioning material strand in its length direction may cause compression of the cushioning material winding in its radial direction and its circumferential direction. Alternatively, or additionally, compression of the cushioning material strand in its height direction and/or width direction may result in compression of the cushioning material winding in its radial direction and/or axial direction.

Generally, the length direction of the cushioning material strand prior to winding corresponds to the circumferential direction of the cushioning material winding. Depending on the orientation of the cushioning material strand relative to the cushioning material winding, its width direction, its height direction, or a combination of width and height directions may correspond to the axial width of the cushioning material winding and/or correspond to the radial width of a turn of the cushioning material winding.

According to one embodiment, the cushioning material winding becomes denser than the uncompressed cushioning material strand by at least 1% and/or at most 100%, in particular by 5% to 80%, preferably by at least 10% and/or at most 60%, particularly preferably by 10% to 20%, as a result of the compression. The uncompressed cushioning material strand is discharged from the cushioning conversion machine and/or fed to a strand access, in particular of a device housing of the processing device. It may be preferred that the cushioning material winding becomes at least 20%, at least 40%, at least 60%, or at least 100% denser than the uncompressed cushioning material strand discharged from the cushioning material conversion machine and/or the cushioning material strand at the strand access of the device for processing a cushioning material strand as a result of the compression. In particular, the density of the cushioning material winding is no greater than ten times, no greater than five times, no greater than three times, or no greater than twice the density of the cushioning material strand. It has been shown that such compression of the cushioning material strand to the cushioning material winding improves the suitability for securing particularly heavy and/or sensitive transport goods without losing the cushioning effect of the cushioning material strand formed in particular from paper, preferably recycled paper.

According to an exemplary embodiment of the method for processing a cushioning material strand, the cushioning material strand is at least partially compressed by applying a tensile force to the cushioning material strand against the circumferential winding direction of the cushioning material winding during winding. By pulling the cushioning material strand during winding along its longitudinal extension corresponding to the winding circumferential direction, a denser packing of the cushioning material strand in the wound shape can be achieved. For example, in this manner, the cushioning material strand having protrusions or indentations in the cross-sectional direction, such as an embossment, can be caused to be wound, at least in sections, such that adjacent turns of the cushioning material winding engage one another. Alternatively, or additionally, the cushioning material strand may be pulled in the longitudinal direction or conveying direction by applying a tensile force, which may cause a transverse contraction in the cushioning material strand width direction and/or cushioning material strand height direction, resulting in a relatively higher density of the cushioning material winding relative to the density of the cushioning material strand. A tensile force may be applied to the cushioning material strand during winding by braking the cushioning material strand relative to the winding circumferential speed. By decelerating the conveying speed of the cushioning material strand relative to the circumferential speed at the outer turn or outer winding, it can be achieved that the cushioning material strand is pulled onto the cushioning material winding with a tension in the circumferential direction so that no free space remains between adjacent turns. By avoiding free spaces between adjacent turns of the cushioning material winding, it is ensured that heavy and/or sensitive transport goods are safely protected from corners or edges slipping through gaps between adjacent turns. By applying a tensile force to the cushioning material strand against the circumferential winding direction, a transverse contraction of the cushioning material strand can be achieved, resulting in a compression.

According to a further development of the method according to the disclosure, the cushioning material strand is wound at a winding circumferential speed. The cushioning material strand may be discharged from a cushioning conversion device at a discharge speed. The discharge speed and the winding circumferential speed may be different or equal. Prior to winding, the cushioning material strand is decelerated to a conveying speed lower than the circumferential speed. In particular, the conveying speed may be at least 1%, at least 5%, preferably 10% lower than the circumferential speed. The conveying speed is not more than 80%, in particular not more than 50%, not more than 30% or not more than 20%, lower than the circumferential speed. In an exemplary embodiment, the conveying speed is 1% to 80%, in particular 5% to 50% or at most 30% lower than the circumferential speed. In an exemplary embodiment, the winding circumferential speed of the outer layer of the cushioning material winding is substantially constant. In an exemplary embodiment, the winding speed of the winding device may be set and/or controlled to be constant as a function of the radial width of the cushioning material winding or the winding radius. As a result of the speed difference between winding circumferential speed and conveying speed, the winding density is increased compared to the strand density. Braking of the cushioning material strand can be achieved, for example, by a braked unwinding wheel at the winding point. The winding point may be the point at which the cushioning material strand tangentially meets the cushioning material winding and/or at which the outer layer of the cushioning material winding begins in the circumferential direction. In general, the winding point may be the transition between the straight and spiral course of the cushioning material strand during winding.

According to an exemplary embodiment of a method according to the disclosure, which can be combined with the previous ones, the cushioning material strand is at least partially compressed by applying a squeezing force to the cushioning material strand during winding, in particular in the radial direction relative to the winding center. In an exemplary embodiment, the squeezing force may be applied at or near the position where the cushioning material strand meets the outer layer of the cushioning material winding. In an exemplary embodiment, the squeezing force is applied to the outer layer of the cushioning material winding. The squeezing device may be a sliding shoe resting on the cushioning material strand or a roller, roll or the like which is in sliding or rolling engagement with the cushioning material strand and/or the outer layer. By applying a squeezing force to the cushioning material strand during winding, the cushioning material strand can be squeezed and thereby compressed in a transverse direction, preferably the height direction, alternatively or additionally the width direction, of the cushioning material strand, so that the density increases during winding. If the squeezing force is exerted on the cushioning material strand where the cushioning material strand forms, in particular begins to form, the outer layer of the cushioning material winding (winding point), the squeezing force also acts on already wound inner turns of the cushioning material winding, so that these also experience compression in the radial direction. The squeezing force can be introduced into the cushioning material strand, for example, by a particularly freely rotatable unwinding wheel at the winding point. For example, in a winding device comprising a plurality of deflectors between which there is free space, the cushioning material strand can be pressed into the free space with the aid of a squeezing force in the radial direction, so that this free space is also preferably tightly filled with cushioning material.

According to one embodiment of a method according to the disclosure, an outer layer, in particular an outer end layer, of the cushioning material strand is provided with a fixing means (fastener) for stabilizing the cushioning material winding, such as an adhesive tape, in particular only after the outer end layer has been wound around the winding center. By using a fixing means, such as an adhesive, for example an adhesive tape, or an embossing, the cushioning material winding can be stabilized against falling apart, in particular in order to keep the cushioning material winding stable, in particular dimensionally stable, in the wound shape after being discharged from the device.

According to an exemplary embodiment, the cushioning material strand is guided in such a way that the transverse direction or width direction of the cushioning material strand corresponds to the axial direction of the cushioning material winding. Alternatively, or additionally, the cushioning material strand can be guided in such a way that the height direction of the cushioning material strand corresponds to the radial direction of the cushioning winding. According to another, alternative embodiment, the cushioning material strand can be guided in such a way that the width direction of the cushioning material strand corresponds to the radial direction of the cushioning material winding and the height direction of the cushioning material strand corresponds to the axial direction of the cushioning material winding.

In a further embodiment, a measuring area may be provided between the cushioning conversion device, in particular between the discharge of the cushioning conversion device, and the winding device, in particular the strand access of the device housing. For example, a measuring device can be arranged in the measuring area, which comprises a dancer roller. In this area, the web tension of the cushioning material strand can be measured by the measuring device, which is in particular designed as a dancer roller, in particular in order to adapt the winding speed to the web tension. A measured negative web tension can cause the cushioning material to pile up in the winding space, while a positive web tension can cause the cushioning material strand to tighten up to the point of breaking. Likewise, it is conceivable that the cushioning material strand in the measuring area establishes a compensation zone or buffer zone, which is stockpiled, in particular by means of a storage, to ensure that sufficient material is always available to the winding drive without the cushioning conversion device filling the winding space with an unnecessary amount of paper material. The measuring device or measuring area can thus be used to resolve the conflict between cushioning material jam and cushioning material tear-off.

In a further embodiment, the cushioning material strand can be at least partially compressed by pretensioning the winding center towards the cushioning conversion machine or an counter bearing, such as a deformation device for compressing the cushioning material strand at an outer layer of the cushioning material winding, in particular a transverse contraction means for causing contraction deformation of the cushioning material strand at the outer layer of the cushioning material winding, or a squeezing means for applying a squeezing force to the cushioning material strand at the outer layer of the cushioning material winding, in particular in the radial direction of the cushioning winding. The pretensioning may be achieved by applying a pretensioning force directed in the direction of the cushioning conversion machine or the counter bearing. In other words, the winding center may be pressed against the cushioning conversion machine or the counter bearing so that the cushioning material strand section located between the winding center and the cushioning conversion machine or counter bearing is compressed or squeezed by means of the pretensioning force, resulting in compression.

According to an exemplary embodiment, the winding center is moved away from the cushioning conversion machine or the counter bearing while maintaining the pretensioning force as the winding diameter of the cushioning material winding increases. For example, the winding device can be movably mounted relative to the cushioning conversion machine or the counter bearing by means of a guide device, such as a linear guide device or a rotary guide device, in such a way that it is moved, in particular pressed, away from the cushioning conversion machine or the counter bearing while maintaining the pretensioning force as the winding diameter of the cushioning material winding increases. The combination of pretension and movable bearing allows compression of the cushioning material winding to be achieved, in particular adjusted, in a simple manner. For example, the compression realized in this way can be purely mechanical, without the need for electrical components. In another further development, the cushioning material strand can be at least partially compressed by the winding center pressing against the unwinding wheel or brake roller of the squeezing and/or transverse contraction means.

According to an exemplary embodiment, the cushioning material strand can be at least partially compressed by the winding center moving at a differential speed relative to and/or in relation to its circumferential speed to the web speed of the packaging material web, in particular away from the cushioning conversion machine. For example, the winding device is movably mounted relative to the cushioning conversion machine. An electrical control system can be provided for adjusting the differential speed, in particular to achieve a desired degree of compression and/or to prevent the cushioning material strand from tearing.

The disclosure also relates to a device for processing a cushioning material strand, which is produced by a cushioning conversion machine from a web-shaped stock material, in particular a roll or a leporello stack, for example of paper, into a cushioning material winding. The device for processing the cushioning material strand comprises a winding device for winding the cushioning material strand around a winding center.

According to the disclosure, the device for processing a cushioning material strand comprises a deformation device for compressing the cushioning material strand at the outer layer of the cushioning material winding. In particular, the device for processing a cushioning material strand may be provided for carrying out the method described above. In particular, the deformation device may be designed and arranged for performing compression of the cushioning material strand when winding the cushioning material strand into a cushioning material winding as described above.

The deformation means can deform the cushioning strand in a transverse direction, for example in the width direction and/or in the height direction. Alternatively, or additionally, the deformation device may deform the cushioning material strand in longitudinal direction, wherein in particular the longitudinal direction corresponds to the winding circumferential direction. The deformation device may compress the cushioning material strand at the outer layer of the cushioning material winding by at least 5%, or at least 10%. The deformation device may act on the outer layer in the axial direction, radial direction, and/or circumferential direction of the cushioning winding. The deformation device may be adapted to be brought into axial and/or radial contact with the cushioning material strand. In particular, the deformation device may be pivotally or rotatably mounted about an axis which may be in particular parallel to the winding axis of the winding device. The deformation device may comprise a particularly pneumatic actuator for providing deformation forces. The deformation device may comprise a spring, in particular a gas pressure spring, for providing a pretensioning force.

According to a further development of a device according to the disclosure, the deformation device may comprise a transverse contraction means for causing a contraction deformation of the cushioning material strand at the outer layer of the cushioning material winding. In particular, the transverse contraction means is adapted to apply a tensile stress to the cushioning material strand between the cushioning conversion machine and the winding device and/or the winding device and a strand access of the winding device.

According to a further development of a device according to the disclosure, the transverse contraction means may comprise a strand braking device for braking the cushioning material strand between the cushioning conversion machine and the winding device. The strand braking device may comprise one or more rollers and/or one or more sliding shoes for contacting, guiding and/or braking the cushioning material strand, in particular the cushioning material strand end, and/or the outer layer of the cushioning material winding. In particular, the strand braking device may comprise at least one braked roller, roll or wheel for braking the cushioning material strand to a reduced conveying speed compared to the circumferential speed at the outer layer of the cushioning material winding and/or compared to a discharge speed of the cushioning conversion device, in particular by at least 1%, at least 5%, at least 10% or at least 15%, in particular less than 30%, less than 25% or less than 20%, for example 10% to 20%. In an exemplary embodiment, the strand braking device is designed to slow down the conveying speed of the cushioning material strand relative to the circumferential speed at the outer layer of the cushioning material winding by not more than 50%. Braking the cushioning material strand relative to the circumferential speed at the outer layer of the cushioning material winding can cause deformation of the cushioning material winding.

According to an embodiment of a device for processing the cushioning material strand, which may be realized alternatively or additionally to the previous embodiments, the deformation means comprises a squeezing means for applying a squeezing force to the cushioning material strand at the outer layer of the cushioning material winding in radial direction of the cushioning winding. The squeezing means may be arranged radially opposite a counter bearing provided by the winding device, in particular a deflector of the winding device. By arranging the squeezing means opposite a counter bearing provided by the winding device, a uniform density of the cushioning material strand in the circumferential direction can be ensured, whereby uneven material properties of the stock material are compensated when winding the cushioning material strand.

According to a further development of the device, the squeezing means comprises a lever arm which is pivotably supported on the device, in particular a housing of the device, in particular a housing of the winding device, and/or which can be brought into particularly tangential contact with the outer layer of the cushioning material winding. In particular, the lever arm comprises an actuator, such as an in particular pneumatic biasing spring, for providing the squeezing force. The lever arm may comprise a pivoting device, such as a pivot joint and/or a rotary joint with predetermined lever mobility. The lever arm may be configured to provide a reduction or transmission of the lever-acting force provided by the actuator, particularly biasing force, for providing the squeezing force to the outer layer of the cushioning material winding. For example, the lever arm can provide the force, in particular biasing force, of the actuator in a ratio of 1 to 5 or 1 to 10, preferably at least 1 to 2 and/or at most 1 to 20, preferably at least 1 to 10 and/or at most 1 to 5 stepped down, as a squeezing force for deforming the cushioning material strand at the outer layer of the cushioning material winding. A reduction of the actuator force in relation to the squeezing force has the advantage that, on the one hand, the cushioning material strand is subjected to lower loads when the squeezing means is confronted with changing material properties, so that cushioning strand breakage and/or material jamming, as well as a defect of the deformation means, is reliably avoided.

According to one embodiment of the device, which can be combined with the previous ones, the device comprises at least one guide member, such as a sliding shoe or a particularly free-running wheel, which is movably mounted, in particular spring-damped and/or spring-preloaded, relative to the winding device in such a way that it follows a height profile of the circumferential course of the outer layer. The guide member can restrict the freedom of movement of the cushioning material strand relative to the winding device in the radial direction and/or axial direction to an in particular predetermined range. In particular, the guide member can define the position of the cushioning material strand at the outer layer of the cushioning winding in the radial direction and/or axial direction. The guide member can ensure secure winding of the cushioning material strand onto the cushioning material winding. The guide member and a squeezing means of the deformation means can be realized in functional union. The guide member, for example the sliding shoe or the wheel, can simultaneously apply the squeezing force to the cushioning material strand at the outer layer of the cushioning material winding in the radial direction, so that the cushioning material winding is compressed relative to the cushioning material strand.

According to one embodiment of a device for processing the cushioning material strand, which can be combined with the previous ones, at least one strand deflector is provided for deflecting the cushioning material strand between a strand access of the device and the winding device and/or the cushioning conversion machine and the winding device. In particular, the strand deflector is rotatably mounted about an axis of rotation extending in particular in the direction of gravity or relative to the winding axis. According to an exemplary embodiment, the strand deflector may form part of the strand braking device of the transverse contraction means. In particular, the strand deflector is adapted to determine a conveying direction for the cushioning material strand that deviates from the discharge direction of the cushioning conversion device and/or the circumferential direction at the contact point of the cushioning winding and the cushioning material strand. The strand deflector can be movable relative to the winding center and/or relative to the cushioning conversion device.

According to one embodiment of the processing device, which can be combined with the previous ones, the device comprises a fixing device, such as an adhesive tape dispensing device, for providing the outer layer, in particular the outer end layer, of the cushioning material strand with a fixing means (fastener) for stabilizing the cushioning material winding.

The device according to the disclosure may be configured to perform the method according to the disclosure. According to one embodiment, a system may comprise a device according to the disclosure and a cushioning conversion device. Alternatively, or additionally, a system may comprise a device according to the disclosure and a cushioning material strand and/or a stock material.

According to an exemplary embodiment, the device comprises a pretensioning means for pretensioning the winding device towards the cushioning conversion machine or a counter bearing, such as the deformation means for compressing the cushioning material strand at an outer layer of the cushioning material winding, in particular the transverse contraction means for causing contraction deformation of the cushioning material strand at the outer layer of the cushioning material winding, or the squeezing means for applying a squeezing force to the cushioning material strand at the outer layer of the cushioning material winding, in particular in the radial direction of the cushioning winding. For example, a spring means may be used to apply the pretensioning force.

According to a further exemplary embodiment, the winding device is movably mounted relative to the cushioning conversion machine or the counter bearing by means of a guide device, such as a linear guide device or a rotary guide device, in such a way that it can be moved, in particular pressed, away from the cushioning conversion machine or the counter bearing while maintaining the pretensioning force as the winding diameter of the cushioning material winding increases. For example, the pretensioning generation and the movable bearing can be formed as a unit, for example by a spring-loaded linear guide. For example, the compression realized in this way can be purely mechanical, without the need for electrical components.

According to an exemplary embodiment, the cushioning material strand can be at least partially compressed by the winding center moving at a differential speed relative to and/or in dependence on its circumferential speed to the web speed of the packaging material web, in particular away from the cushioning conversion machine. For example, the winding device is mounted movably relative to the cushioning conversion machine, in particular by means of a guide device, such as a linear guide device or a rotary guide device. An electrical control system can be provided for setting the differential speed, in particular in order to achieve a desired degree of compression and/or to avoid tearing of the cushioning material strand.

In the following, a device for processing a cushioning material strand into a cushioning material winding is generally provided with the reference sign 1. In an exemplary embodiment, the device 1 may include a winding device 3 and a deformation device designed as a squeezing means 50 and/or a transverse contraction means (contractor) 60. A cushioning material winding is generally provided with reference sign 8 and a cushioning material strand is provided with reference sign 7.

For example, the devices of the applicant marketed under the brand names PaperJet or SpeedMan can be considered as cushioning conversion machines 9. The stock material for forming into a cushioning material is, in particular, paper web material, which can be stored, for example, as a roll or fanfold stack. The web-shaped stock material generally has a length dimension that is several orders of magnitude greater than the transverse dimension (width). The transverse dimension of the stock material is several orders of magnitude greater than the thickness of the stock material. The thickness of the stock material is generally less than 1 mm. The width of the stock material is at least a few centimeters and at most a few meters. The longitudinal extent of the stock material is more than 10 m, preferably more than 50 m, in particular more than 100 m. The stock material may comprise several layers of packing material.

In the cushioning conversion machine 9, the web-shaped stock material is formed into a strand of three-dimensional cushioning material 7. In particular, the cushioning conversion machine 9 can produce a tubular or strip-shaped cushioning material strand 7 from the web-shaped stock material. When the stock material is formed in the cushioning conversion machine 9, a cushioning material strand 7 is produced whose transverse dimension (width) is reduced relative to the transverse dimension (width) of the stock material and whose height is substantially greater than the thickness of the stock material. The height and the width of the cushioning material have substantially the same order of magnitude after forming. In an exemplary embodiment, the height of the cushioning material may be at least ⅕, in particular at least ½, of the width of the cushioning material and/or at most five times, preferably at most twice, the width of the cushioning material. The width and height of the cushioning material strand 7 are preferably several centimeters. The forming in the cushioning conversion machine preferably takes place continuously, so that a tube-like cushioning material strand 7 is produced from the web-shaped stock material, the longitudinal extent of the cushioning material strand 7 corresponding substantially to the longitudinal extent of the stock material, apart from the contractions accompanying the forming.

The cushioning conversion machine 9 discharges the cushioning material strand 7 at a discharge opening in a discharge direction A. The cushioning conversion machine 9 may be arranged and its discharge opening oriented such that the discharge direction A is substantially in the horizontal direction. With respect to the winding axis 21 of the winding device 3 described below, the discharge direction A may be oriented in a radial direction R. In the vertical direction, the discharge of the cushioning material strand 7 from the cushioning conversion machine 9 occurs approximately at the vertical level of the deflector 23 of the winding device 3. The winding device 3 is arranged within a housing 27 of the device 1 for processing a cushioning material strand 7 into a cushioning material winding 8. The housing 27 has a strand access 29, for the cushioning material strand 7 delivered from the cushioning conversion machine 9.

In FIG. 1, a device housing 27 for preventing unintentional engagement in the winding device 3 and/or the adhesive tape dispensing device 5 is schematically indicated. As can be seen in particular in FIG. 1, the device housing 27 has a strand access 29 through which the cushioning material strand 7 can be transferred to the device 1. Transferring may include the introduction of the cushioning material strand 7 via the strand access 29 into the device 1. Transferring can also comprise conveying the cushioning material strand 7 in the direction of the winding center 21, in particular between two deflectors 23 of a winding device 3.

As can be seen in FIG. 1, an adhesive tape dispensing device 5 can be aligned with respect to the winding device 3 in such a way that the adhesive tape dispensed by the adhesive tape dispensing device can be applied to an outer layer 18 of the cushioning material strand. In particular, the adhesive tape dispensing device 5 comprises an adhesive tape head 39 to which an adhesive tape supply in the form of an adhesive tape roll 41 is attached. Adhesive tape 17 is unwound from the adhesive tape roll 41 and guided to a counter bearing, such as a deflection roller 45. The adhesive tape head 39 is mounted movably relative to the winding device 3.

In particular, an adhesive tape pivoting mechanism 49 is responsible for the movable mounting. Optionally, a linear drive can also be provided for guiding the adhesive tape dispenser 5 to the cushioning material strand. The adhesive tape pivoting mechanism 49 has a rotatably mounted pivoting arm 47 for pivoting the adhesive tape head 39 to the outer layer 18 of the cushioning material strand 7. For this purpose, the pivoting arm 47 is attached to the adhesive tape head 39 with one end and is rotatably mounted with the other end.

In the state of the adhesive tape head 39 being hinged to the outer layer 18, the adhesive tape 17 is pressed against the outer layer 18 via the counter bearing 45 (not shown in more detail). In the process, a slight pressing force is affected without compression effect, in particular via a linear drive not shown, which is hinged to the pivoting arm 47. Following the approach of the adhesive tape 17 to the outer layer 18, adhesive tape 17 is wound around the outer layer 18. The winding of the adhesive tape 17 around the outer layer 18 can be affected by driving the winding device 3.

Particularly in the case of cushioning windings 8 to be wound horizontally, their winding has shown that it is advantageous to guide the paper material strand 7 from the exit of the packaging material device 9 (in particular the PaperJet) to the tangential winding point 2. A particularly free-rotating unwinding wheel 55 or a smooth plate can be arranged at the winding point 2, in particular to support the formation of the winding 8. The unwinding wheel 55 can roll on the already wound winding body. This unwinding wheel 55 may be spring-biased. To increase a frictional force to hold the uppermost winding layer or outer layer 18, the unwinding wheel 55 may be equipped with a braking device or braking surface and be referred to as a braking roller 65.

In an exemplary embodiment, the unwinding wheel 55 engages mainly in a central, in particular roll-embossed strand area, so that adjacently arranged cavity beads of the cushioning material strand 7 are not pressed flat. Alternatively, the contact pressure can be applied over the entire strand width. This can result in further compression due to the compression of the cavity beads.

FIG. 1 shows a schematic representation of a device 1 for processing an uncompressed cushioning material strand 7 into a compressed cushioning material winding 8. The cushioning material strand 7 is provided to the device 1 at a strand access 29. For example, the cushioning material strand 7 may be produced by a cushioning conversion machine 9 from a web-shaped stock material not shown in more detail. The cushioning material strand 7 is fed to the device 1. In the device 1, the cushioning material strand 7 is lead to the cushioning material winding 8 and passes into the cushioning material winding 8 at a winding point 2. At the winding point 2, a deformation device can act on the cushioning material strand 7 to compress it.

For example, as shown in FIG. 1, the deformation device comprises a transverse contraction means 60 formed by a strand braking device (brake) with a plurality of rollers 61, 63, 65 acting on the cushioning material strand. The transverse contraction means 60 comprises a strand deflector 61, 63 near the strand access 29. The deformation device further comprises a braked unwinding wheel 65 in contact with the cushioning material strand 7 at the winding point 2.

Between the strand deflector 61, 63 and the brake roller or brake roll 65, the cushioning material strand 7 is moved at a conveying speed f. The conveying speed f is lower than the circumferential speed v of the cushioning material winding 8 as a result of braking by the brake roller 65 and/or the strand deflector 61, 63. According to an exemplary embodiment, the cushioning material winding 8 can have a constant outer circumferential speed v, in particular irrespective of its extension in the radial direction R. If the conveying speed f is lower than the circumferential speed v, the cushioning material strand 7 is pulled in the winding circumferential direction U and in the longitudinal direction of the cushioning material strand 7.

The tensile force Z acting on the cushioning material strand 7 manifests itself in a tensile stress in the longitudinal direction of the cushioning material strand 7, so that the cushioning material strand 7 stretches in its longitudinal direction and simultaneously contracts in at least one transverse direction, for example the cushioning strand width direction and/or the cushioning strand height direction. The deformation device thus compresses the cushioning material strand 7 in a transverse direction, i.e. in strand width direction and/or in strand height direction, corresponding to the compressed axial direction and/or radial direction of the cushioning material winding 8. The compression of the cushioning material strand 7 is maintained at least partially, preferably completely, during winding of the cushioning material into a cushioning material winding 8.

The deformation device of the device 1 may alternatively or additionally comprise a squeezing means 50. The squeezing means 50 may comprise a particularly free-running wheel 55 which presses on the cushioning material winding 8 in radial direction R at the winding point 2 in order to achieve a compression of the cushioning material strand 7 or of the cushioning material winding 8. As an alternative to a wheel 55, the squeezing means for applying the squeezing force Q to the cushioning material strand 7 may comprise a sliding shoe or another part movable relative to the cushioning material strand to be wound.

The squeezing means 50 can comprise a lever arm 51 on which the guide member, in particular the unwinding wheel 55, which can be braked, is pivotably and/or rotationally mounted. The lever arm 51 can be issued with an actuator, for example a particularly pneumatic pretension spring 53 for providing the squeezing force Q. The lever arm 51 can be hinged to the device 1, in particular the housing 27, in such a way that the force provided by the actuator 53 is exerted in a reduced manner as a squeezing force Q on the cushioning material strand 7 and/or the cushioning material winding 8.

It is conceivable that the squeezing means 50 acts on the cushioning material strand 7 and/or the cushioning material winding 8 at a location other than the winding point 2. For example, the squeezing means 50 can act on the cushioning material winding 8 in the circumferential direction U behind the winding point 2.

Alternatively, it is conceivable that a squeezing means 50 acts on the cushioning material strand 7 in the longitudinal direction of the cushioning material strand upstream of the winding point 2. For example, the squeezing means 50 may comprise a strand deflector 63, which may be realized as a sliding shoe or as a particularly free-running wheel, provided with a counter bearing in the form of a particularly free-running counter-wheel 61 or a sliding shoe not shown in greater detail, in order to exert the deforming squeezing force Q on the cushioning material strand 7. A squeezing means 50, which plastically deforms the cushioning material strand 7 in the transverse direction upstream of the winding point 2 by a squeezing force Q, can be provided to be used in combination with further squeezing means.

The use of a squeezing means 50, which applies a squeezing force Q to the outer layer 18 of the cushioning material winding 8 at the winding point 2 or in the circumferential direction U behind the winding point 2, may be preferred, for example, for a space-saving design of a device 1. By arranging the squeezing means 50 to apply a squeezing force Q in radial direction R to the cushioning material winding 8, in particular at or in circumferential direction U behind the winding point 2, for example, a cavity existing between the two deflectors 23 of the winding device 3 can be filled by cushioning material to achieve a cushioning material winding 8 of constant high density.

In particular, the actuator 53 can be designed as a hydraulic or pneumatic spring, in particular as a gas tension spring. The force provided by the actuator 53 can preferably be between 5 N and 100 N, in particular 100 N, 150 N, 200 N, 300 N, 400 N or 500 N. With the aid of the lever 51, the actuator force can be reduced by 1:3 to 1:10, in particular about 1:5, so that the squeezing force Q is 20 N, 30 N, 40 N, 60 N, 80 N±5 N, in particular ±2 N. The squeezing force Q on the cushioning material winding 8 is preferably between 10 N and 500 N. In particular, the squeezing force Q is between 20 N and 100 N.

The embodiment of the device according to the disclosure as shown in FIG. 2 differs from the embodiment according to the disclosure in FIG. 1 essentially by the squeezing and/or transverse contraction means 50, 60. In FIG. 2, the lever arm 51 is mounted in an articulated manner on the housing 27 and has an angled shape. At one end of the lever arm 51 is mounted the unwinding wheel 55, which may be in the form of a brake roller 65. Downstream of the strand access 29, a brake arm 67 fixedly attached to lever arm 51 extends away therefrom. Mounted on the brake arm 67 is the roller 61 which forms the strand deflector 63. According to FIG. 2, the roller 61 formed as the strand deflector 63 is further designed as a brake roller 69. The brake roller 69 can be mounted so as to rotate freely. Furthermore, the brake roller 69 can be provided as an actuating device for the brake roller 69 that can be controlled and triggered individually, independently of a specific parameter. For example, the brake roller 69 may be coupled to an electronic brake (not shown). It should be understood that when the brake roller is mounted in a freely rotating manner, the braking force is generated purely on the basis of the friction between the brake roller 69 and the winding strand 7. The electronic brake may, for example, be implemented as an eddy current brake. Furthermore, it is conceivable that the surface of the brake roller 69 is equipped with a material coating that increases the frictional force.

In a position not shown of the lever arm 51, the lever arm 51 is located in such a way that the cushioning strand 7 can be inserted as straight as possible, i.e. without deflection, between the winding tines 23. As can be seen in FIG. 2, the brake roller 69 is arranged on the left-hand side of the schematically illustrated cushioning strand 7 and in such a way that the brake roller 69 allows the cushioning material strand 7 to pass unhindered when it is threaded between the winding tines 23, i.e. in particular does not deflect or divert. Together with the lever arm 51 arranged on the right-hand side with respect to the cushioning material strand 7, i.e. on the opposite side to the brake roller 69, the cushioning material strand 7 can be guided, the brake roller 69 and the lever arm 51 forming a kind of shaft which permits centered feeding of the cushioning material strand 7 between the winding tines. As the winding diameter increases, the lever arm 51 pivots into the further operating position shown schematically in FIG. 1, in which the cushioning material strand 7 slides along the brake roller 69 and rolls and is braked thereon. The brake roller 69 therefore causes the cushioning material strand 7 to tighten.

FIG. 3 shows a further schematic embodiment of a device 1 according to the disclosure, which differs from the preceding embodiments according to FIGS. 1 and 2 essentially in the realization of the squeezing means 50. The squeezing means comprises two scissor-like pivot arms 71, 73 which are pivotally connected to each other at a common pivot point 75 and are pivotally attached to the housing 27. At each end of the scissor-like pivot arms 71, 73 a respective roller 61 is disposed which may be formed as a strand deflector 63 and/or a brake roller 69. For example, the brake rollers 69 form a pair of brake rollers. The scissor arms 71, 73 can be of different types or can be of different lengths. In general, the scissor arms 71, 73, as already before, are arranged on the housing 27 in such a way that initially an insertion of the cushioning material strand 7 between the two winding tines 23, which is as straight and centered as possible, is made possible. As the diameter of the winding increases, the rollers 61, 63, 69 abutting the cushioning material strand 7 pivot about the common pivot point 75 of the scissor arms 71, 73 in a scissor-like rotary movement. The scissor arms 71, 73 can be designed in such a way that when the rolls 61, 63, 69 are displaced and thus the scissor arms 71, 73 are pivoted, the distance between the two rollers 61, 63, 69 of the two scissor arms 71, 73 decreases so that the cushioning material strand 7 is increasingly tightened, slowed down and/or deflected. For example, initially with smaller winding diameters, only the roller 61 arranged on the left-hand side of the cushioning material strand 7 in FIG. 3 can be in contact with the cushioning material strand 7, and as the winding diameter increases, the roller 61 arranged on the right-hand side of the cushioning material strand 7 can also increasingly come into contact with the cushioning material strand 7.

In FIG. 4, the squeezing means 50, the transverse contraction means 60 and the winding device 3 are shown schematically in a perspective view. The remaining components are omitted for ease of understanding. Similar to FIG. 2, both the squeezing means 50 in the form of a pair of rollers 61 and a transverse contraction means 60 in the form of a pressure plate 83 are arranged on the lever arm 51, which is substantially rectangular in cross-section in FIG. 4. The pressure plate 83 essentially fulfills the function of the unwinding wheel 55 and can generate the transverse compression of the cushioning material winding via a clamping force generated as a result of the bearing of the lever arm 51. Fixedly connected to the lever arm 51 are two substantially identically shaped brake arms 67 extending parallel to each other by means of a substantially straight bar 81 which, together with the two brake arms 67, forms a U-section. The two brake arms 67 are each configured to support and receive the pair of rollers 61, which may be configured as strand deflector 63 and/or brake roller 69. The rollers 61 may be mounted to rotate freely via a shaft 77, 79 attached to the brake arms 67. The distance between the two rollers 61 may be fixed or variable, in particular adjustable. In this embodiment, the two rollers 61 together with the brake arm sections extending between them form a closed shaft section 85 for passing the cushioning material strand 7.

FIG. 5 shows a schematic representation of the mounting of the rollers 61, in which they can be moved towards and away from each other in order to change the distance between them. For example, one of the two rollers 61 can be axially displaceable in order to be able to change the distance to the adjacent roller 61. In FIG. 5, for example, the left roller 61 is translationally displaceable, indicated by both the double arrow 87 and the floating bearing 89, while the adjacent roller 61 is fixedly attached to the bearing frame 91, indicated by the fixed bearing 93. The adjustment of the distance between the two rollers 61 can be realized, for example, by means of tension springs 95, 97. In addition, a counterholder 99 in the form of a U-section is firmly connected to the displaceable brake roller 61.

The adjustability can be stepless or stepwise. For stepless adjustment, indicated for example in FIG. 5, the counterholder 99 comprises an internal thread which cooperates with an external thread of a set screw 101, so that the counterholder 99 and the set screw 101 can be screwed into each other or unscrewed from each other. As a result, the displaceable roller 61 can be displaced via a displacement device provided in the frame 91, such as an elongated hole. The adjustment of the distance can be done electronically, for example. Furthermore, a latching, in particular latching means, such as form-fit latching means, preferably latching lugs and/or latching grooves, can be formed in the frame for the roller 61, which define a fixed position and thus a fixed predetermined distance between the two rollers relative to one another.

FIG. 6 schematically shows a section of a cushioning material strand 7 and a pressure roller 55, which can also be designed as a brake roller 65, in a perspective view. In the front view, the cushioning material strand 7 has a dumbbell or peanut shell shape with lateral cushioning spaces 103, 105 and a central, in particular wavy, deformation region 107. As shown in FIG. 6, the pressure roller 55 is preferably formed substantially shape-complementary to the cushioning strand 7. In the front view, the pressure roller 55 can thus comprise a mountain-valley structure comprising a central mountain 109 projecting outwardly and two radially inwardly offset valleys 111 adjoining it in the axial direction. A curvature of the mountain-valley structure can thereby also be shape-adapted to an outer contour of the cushioning strand 7, in particular in such a way that the mountain 109 projects or engages substantially into the deformation zone 107 and the two crumpled regions 103, 105 project or engage into the valleys 111 of the pressure roller. As a result, it can be provided that the cushioning strand 7 can come into contact with the pressure roller 55 substantially over its entire surface and that the pressure roller 55 can roll substantially completely along the cushioning strand 7.

The features disclosed in the foregoing description, the figures, and the claims may be significant, both individually and in any combination, for the realization of the disclosure in various embodiments.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms “first”, “second”, etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms “comprise” and “have” and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to “one embodiment,” “an embodiment,” “an exemplary embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 device for processing a cushioning material strand
2 winding point
3 winding device
5 adhesive tape dispensing device
7 cushioning material strand
8 cushioning material winding
9 cushioning conversion machine
17 adhesive tape
18 outer layer
21 winding axis
23 deflector
27 housing
29 strand access
39 adhesive tape head
41 adhesive tape roll
45 deflector roll
47 pivoting arm
49 adhesive tape pivoting mechanism
50 squeezing means
51 lever arm
53 pretensioning spring
55 unwinding wheel

60 transverse contraction means
61 roller
63 strand deflector
65 braking roller
67 braking arm
69 braking roller
71, 73 scissor arm
75 pivoting point
77, 79 shaft
81 bar
83 pressure plate
85 shaft
87 double arrow
89, 93 bearing
91 frame
95, 97 tension spring
99 counterholder
101 set screw
103, 105 cushioning space
107 deformation zone
109 mountain
111 valley
a discharge speed
f conveying speed
v circumferential speed
A discharge direction
Q squeezing force
R radial direction
U circumferential direction
Z tensile force

The invention claimed is:

1. A method for processing a cushioning material strand produced by a cushioning conversion machine from a web-shaped stock material, the method comprising:

winding, using a winding device, the cushioning material strand around a winding center into a cushioning material winding;

guiding, using at least one guide movably mounted relative to the winding device, the cushioning material strand, wherein the guiding including following a height profile of a circumferential course of an outer layer of the cushioning material winding; and compressing the cushioning material strand, at the outer layer of the cushioning material winding and during winding of the cushioning material strand, into the cushioning material winding.

2. The method according to claim 1, wherein compressing the cushioning material strand increases a density of the cushioning material winding by 10% to 60% as compared to the uncompressed cushioning material strand.

3. The method according to claim 1, wherein the cushioning material strand is at least partially compressed based on an application of a tensile force to the cushioning material strand during winding, counter to a winding circumferential direction of the cushioning material winding.

4. The method according to claim 3, wherein the cushioning material strand is wound at a winding circumferential speed (v), the method further comprising:

discharging the cushioning material strand from the cushioning conversion machine at a discharge speed (a), and performing a braking operation to reduce a speed of the cushioning material strand before winding to a conveying speed (f) which is lower than the winding circumferential speed (v).

5. The method according to claim 1, wherein compressing the cushioning material strand comprises applying a squeezing force to the cushioning material strand in a radial direction (R) relative to the winding center during winding.

6. The method according to claim 1, wherein an outer layer of the cushioning material strand includes a fastener configured to stabilize the cushioning material winding after the outer layer has been wound around the winding center.

7. The method according to claim 1, wherein compressing the cushioning material strand comprises pretensioning the winding center in a direction of the cushioning conversion machine or a deformation device configured to compress the cushioning material strand at the outer layer of the cushioning material winding, wherein the deformation device includes: a transverse contractor including the at one guide and being configured to provide a contraction deformation of the cushioning material strand at the outer layer of the cushioning material winding, or a squeezing device including the at one guide and being configured to apply a squeezing force to the cushioning material strand at the outer layer of the cushioning material winding in a radial direction (R) of the cushioning material winding.

8. The method according to claim 7, wherein, with an increasing winding diameter of the cushioning material winding, the winding center is moved away from the cushioning conversion machine or the deformation device while maintaining the pretensioning force.

9. A device for processing a cushioning material strand produced by a cushioning conversion machine from a web-shaped stock material into a cushioning material winding, the device comprising:

a winding device configured to wind the cushioning material strand around a winding center;

a deformation device configured to compress the cushioning material strand at an outer layer of the cushioning material winding; and at least one guide that is movably mounted relative to the winding device and configured to follow a height profile of a circumferential course of the outer layer.

10. The device according to claim 9, wherein the deformation device comprises: a transverse contractor that includes the at least one guide and is configured to apply a tensile stress to the cushioning material strand between the cushioning conversion machine and the winding device to cause a contraction deformation of the cushioning material strand at the outer layer of the cushioning material winding.

11. The device according to claim 10, wherein the transverse contractor further comprises:

a strand brake configured to apply a braking force to the cushioning material strand between the cushioning conversion machine and the winding device, the strand brake including at least one braked wheel configured to brake the cushioning material strand to a conveying speed (f), which is reduced with respect to a circumferential speed (v) at the outer layer of the cushioning material strand and/or with respect to a discharge speed (a) of the cushioning conversion machine.

12. The device according to claim 9, further comprising a squeezing device, wherein the squeezing device includes the at least one guide and is configured to apply a squeezing force to the cushioning material strand at the outer layer of the cushioning material winding in a radial direction (R) of the cushioning material winding, wherein the squeezing device is arranged radially opposite the winding center and/or at least one deflector of the winding device.

13. The device according to claim 12, wherein the squeezing device comprises a lever arm which is pivotably supported on a housing of the device and/or is configured to be brought into tangential contact with the outer layer of the cushioning material winding, wherein the lever arm includes a pneumatic pretensioning spring configured to provide the squeezing force.

14. The device according to claim 9, wherein the at least one guide is spring-damped and/or spring-biased.

15. The device according to claim 9, further comprising at least one strand deflector configured to deflect the cushioning material strand between a strand access and the winding device, wherein the strand deflector is rotatably mounted about an axis of rotation extending in a direction of gravity.

16. The device according to claim 9, further comprising a fixer configured to provide the outer layer with a fastener configured to stabilize the cushioning material winding.

17. The device according to claim 9, further comprising a pretensioning device configured to apply a pretensioning force to the winding device in a direction of the cushioning conversion machine or towards the deformation device to compress the cushioning material strand at an outer layer of the cushioning material winding, wherein the deformation device includes: a transverse contractor including the at least one guide and configured to cause a contraction deformation of the cushioning material strand at the outer layer of the cushioning material winding, or a squeezing device including the at least one guide and configured to cause a squeezing force to the cushioning material strand at the outer layer of the cushioning material winding in a radial direction (R) of the cushioning material winding.

18. The device according to claim 17, wherein the winding device is configured to be movably mounted relative to the cushioning conversion machine or deformation device such that, with increasing winding diameter of the cushioning material winding, the winding device is configured to move away from the cushioning conversion machine or the deformation device while maintaining the pretensioning force.

19. A device for processing a cushioning material strand produced by a cushioning conversion machine from a web-shaped stock material into a cushioning material winding, the device comprising:

- a winding device configured to wind the cushioning material strand around a winding center;
- a deformation device configured to compress the cushioning material strand at an outer layer of the cushioning material winding; and
- a squeezing device configured to apply a squeezing force to the cushioning material strand at the outer layer of the cushioning material winding in a radial direction (R) of the cushioning material winding, the squeezing device being arranged radially opposite the winding center and/or at least one deflector of the winding device, wherein the squeezing device comprises a lever arm configured to be brought into tangential contact with the outer layer of the cushioning material winding.

20. The device according to claim 19, wherein the lever arm comprises a pneumatic pretensioning spring configured to provide the squeezing force.

21. The device according to claim 19, wherein the lever arm is pivotably supported on a housing of the device.

* * * * *